United States Patent
Wei et al.

(10) Patent No.: US 11,655,331 B2
(45) Date of Patent: May 23, 2023

(54) METHOD FOR PREPARING HIGH-TEMPERATURE SELF-CROSSLINKING AQUEOUS POLYURETHANE DISPERSION

(71) Applicant: SHANGHAI SISHENG POLYMER MATERIALS CO., LTD., Shanghai (CN)

(72) Inventors: Ziao Wei, Shanghai (CN); Yuchun Wei, Shanghai (CN)

(73) Assignee: SHANGHAI SISHENG POLYMER MATERIALS CO., LTD., Shanghai (CN)

(*) Notice: Subject to any disclaimer, the term of this patent is extended or adjusted under 35 U.S.C. 154(b) by 254 days.

(21) Appl. No.: 17/108,688

(22) Filed: Dec. 1, 2020

(65) Prior Publication Data

US 2022/0056194 A1 Feb. 24, 2022

(30) Foreign Application Priority Data

Aug. 24, 2020 (CN) .......................... 202010853878.5

(51) Int. Cl.
| | | |
|---|---|---|
| C08G 18/64 | (2006.01) | |
| C08G 18/73 | (2006.01) | |
| C08J 3/05 | (2006.01) | |
| C09D 175/04 | (2006.01) | |

(52) U.S. Cl.
CPC ............. *C08G 18/64* (2013.01); *C08G 18/73* (2013.01); *C08J 3/05* (2013.01); *C09D 175/04* (2013.01)

(58) Field of Classification Search
CPC ........ C08G 18/64; C08G 18/73; C08G 18/10; C08G 18/227; C08G 18/3206; C08G 18/348; C08G 18/4238; C08G 18/44; C08G 18/4854; C08G 18/6659; C08G 18/6692; C08G 18/755; C08J 3/05; C08J 2375/04; C09D 175/04
See application file for complete search history.

(56) References Cited

U.S. PATENT DOCUMENTS

| 9,404,020 B2 | 8/2016 | Grablowitz et al. | |
|---|---|---|---|
| 2012/0095164 A1* | 4/2012 | Blum | ..................... C08G 18/73 |
| | | | 524/839 |

FOREIGN PATENT DOCUMENTS

| CN | 1377379 A | 10/2002 |
|---|---|---|
| CN | 101381446 A | 3/2009 |
| CN | 101649036 A | 2/2010 |
| CN | 102417598 A | 4/2012 |
| CN | 102731749 A | 10/2012 |
| CN | 102978943 A | 3/2013 |

\* cited by examiner

*Primary Examiner* — Robert S Jones, Jr.
*Assistant Examiner* — Jiangtian Xu
(74) *Attorney, Agent, or Firm* — Ohlandt, Greeley, Ruggiero and Perle, LLP

(57) ABSTRACT

A method for preparing a high-temperature self-crosslinking aqueous polyurethane dispersion. By using isocyanate (NCO) blocking agent to block part of the NCO, and using the hydroxyalkyl ethylenediamine chain extender in the post-chain extension stage to introduce hydroxyl groups, the polymer macromolecular structure containing both blocked NCO groups and hydroxyl groups can be prepared. The aqueous polyurethane dispersion does not need to mix with other waterborne resins and crosslinkers when applied. A sufficient cross-linking reaction is performed between the NCO released and hydroxyl groups on the polymer macromolecular chain to form a high-density cross-linked structure when curing at 100-150° C. for 20-30 min, thus obtaining a high-performance waterborne coating that can be used in the form of one-pack.

7 Claims, No Drawings

METHOD FOR PREPARING HIGH-TEMPERATURE SELF-CROSSLINKING AQUEOUS POLYURETHANE DISPERSION

CROSS REFERENCE TO RELATED APPLICATION

This application claims the priority of Chinese Patent Application No. 202010853878.5, entitled "Method for preparing high-temperature self-crosslinking aqueous polyurethane dispersion" filed with the China National Intellectual Property Administration on Aug. 24, 2020, which is incorporated herein by reference in its entirety.

BACKGROUND

1. Field of the Disclosure

The present disclosure relates to the field of polymer material, in particular to a method for preparing high-temperature self-crosslinking aqueous polyurethane dispersion, and a one-pack waterborne coating prepared by curing the polyurethane dispersion at a high-temperature.

2. Discussion of the Background Art

Waterborne polyurethane has been widely used in coatings, inks and adhesives. It has a very broad market application prospect due to its environmental friendly character and excellent comprehensive properties. Two-pack waterborne polyurethane has excellent properties, but it is inconvenient to be applied in many applications. Although the application of one-pack waterborne polyurethane is convenient, its properties have major flaws. For many applications, one-pack waterborne coating system is difficult to achieve the performance of high quality solvent-based coatings in terms of solvent resistance and chemical resistance. One-pack waterborne coatings can not meet the requirements of many applications.

In order to solve the above problems, a lot of companies have prepared waterborne blocked polyisocyanate crosslinker and blocked aqueous polyurethane dispersions. In the process of coating construction, the blocked isocyanate (NCO) is deblocked by heating. After that the deblocked NCO is cross-linked with the active groups on the other waterborne resins to obtain a high-performance one-pack waterborne coating. In U.S. Pat. No. 9,404,020B2, a blocking agent is used to block part of the NCO of polyisocyanate to obtain a blocked polyisocyanate, which is then reacted with a polyamine containing carboxyl or carboxylate hydrophilic groups to make the blocked polyisocyanate crosslinker hydrophilic. In Chinese patent CN101649036B, an isocyanate monomer is reacted with a small molecular polyol to synthesize polyisocyanate, which is then reacted with dimethylolpropionic acid as hydrophilic groups and the remaining NCO is blocked by a blocking agent, and finally is neutralized with a triethylamine to obtain a waterborne blocked polyisocyanate crosslinker. In Chinese patents CN102417598B, CN102731749A and CN102978943A, the blocked aqueous polyurethane dispersions are prepared by synthesizing NCO terminated macromolecular chain polymers with excessive isocyanate monomer, polyol and dimethylolpropionic acid or sulfonate diol, and then blocking NCO by blocking agents. In Chinese patents CN101381446A and CN1238398C, a polyurethane-acrylate copolymer dispersion containing blocked NCO and —C=C— double bonds is prepared, which can be dual-cured by UV and heating. With the UV curing, it is possible to further improve the performance of such product.

In terms of the above waterborne blocked polyisocyanate crosslinker or blocked aqueous polyurethane dispersion, due to the lack of active groups that can react with NCO when used alone, it is difficult to form a high-density cross-linking structure. The above blocked polyurethane is usually used as a crosslinker to react with other waterborne resins. The released NCO can react with the active groups on the waterborne resins, especially crosslink with hydroxyl groups on the waterborne resins after heating and deblocking. When the above blocked polyurethane is mixed with other waterborne resins, there are usually many problems such as compatibility and storage stability due to the composition, the structure and the phase separation. In order to overcome the above problems, the present disclosure designs an aqueous polyurethane dispersion with both blocked NCO and hydroxyl groups, which does not need to mix other waterborne resins and crosslinkers. In actual use, the NCO released by heating is fully cross-linked with the hydroxyl groups on the polymer macromolecular chain to form a high-density cross-linked structure, thereby obtaining a high-performance waterborne coating that can be used in the form of one-pack.

SUMMARY

The technical problem to be solved by the disclosure is to provide a method for preparing a high-temperature self-crosslinking aqueous polyurethane dispersion, which contains both blocked NCO groups and hydroxyl groups on the macromolecular structure, and does not require to add other waterborne resins when used.

Another technical problem to be solved by the disclosure is to provide a one-pack waterborne coating prepared from the aqueous polyurethane dispersion.

As used herein, the singular forms "a", "an" and "the" are intended to include the plural forms as well, unless the context clearly indicates otherwise.

The disclosure is realized through the following technical scheme:

A high-temperature self-crosslinking aqueous polyurethane dispersion, including the following components:
20-40% by weight of a hydroxyl-containing polyurethane with blocked NCO groups;
60-80% by weight of deionized water;
0-8% by weight of an organic solvent;
appropriate amount of a pH regulator;
wherein, the hydroxyl-containing polyurethane with blocked NCO has a blocked NCO content of 1.8-5.0% based on dry solids, and a hydroxyl content of 0.5-2.0% based on dry solids, and they are calculated as follows:

$$NCO\% = \frac{M_{NCO} \times 42}{W \times w\%} \times 100\%$$

$$OH\% = \frac{M_{OH} \times 17}{W \times w\%} \times 100\%$$

NCO % refers to the blocked NCO content as described above, OH % refers to the hydroxyl content as described above, $M_{NCO}$ refers to the mole numbers of NCO, $M_{OH}$ refers to the mole numbers of hydroxyl groups attached to polyurethane, W refers to the weight of polyurethane dispersion in grams, and w % is the solid content of aqueous polyurethane dispersion.

Wherein, the hydroxyl-containing polyurethane with blocked NCO is prepared by the following components:
30-50 parts by weight of a polymer polyol;
0.5-3 parts by weight of trimethylolpropane or trimethylolethane;
30-50 parts by weight of a isocyanate monomer;
3.0-6.0 parts by weight of 2,2-dimethylol propionic acid or 2,2-bis(hydroxymethyl)butyric acid;

5.0-15.0 parts by weight of a NCO blocking agent;
4.0-10.0 parts by weight of a hydroxyalkyl ethylenediamine chain extender;
0.01-0.05 parts by weight of a catalyst;
In view of a method for preparing the above-mentioned aqueous polyurethane dispersion, the process includes:

(a) adding the polymer polyol, trimethylolpropane or trimethylolethane, isocyanate monomer, 2,2-dimethylolpropionic acid or 2,2-bis(hydroxymethyl)butyric acid, catalyst and organic solvent to a reactor according to the formula amount and reacting at 50-90° C. until the NCO content reaches or becomes less than the theoretical value, in which the isocyanate monomer is excessive; due to the addition of trifunctional trimethylolpropane or trimethylolethane, at least trifunctional NCO prepolymer will be obtained, as shown below:

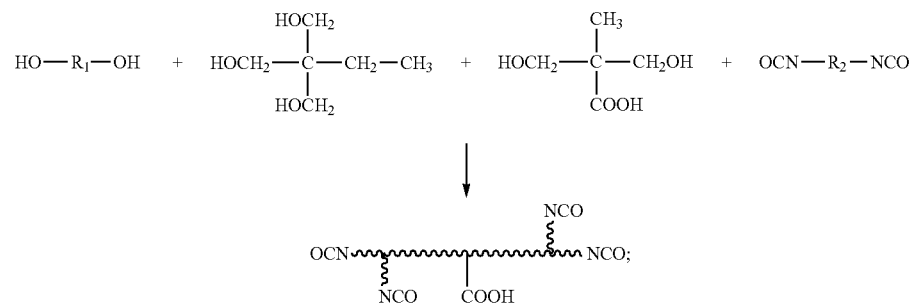

(b) adding the formula amount of NCO blocking agent to the above prepolymer to partially block the NCO, and continuing reacting at 50-90° C. until the NCO content reaches or becomes less than the theoretical value, where $R_BH$ stands for the blocking agent, as shown below:

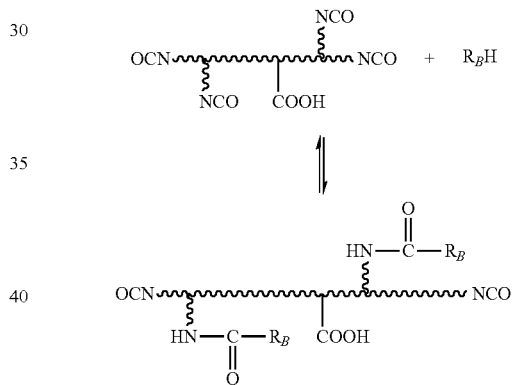

(c) cooling the above polymer to 20-40° C., adding the formula amount of pH regulator, and then dispersing the above reactants into the formula amount of deionized water at a high speed;

(d) then adding the formula amount of the hydroxyalkyl ethylenediamine chain extender, and reacting at 10-40° C. for 30 min to introduce hydroxyl groups through the reaction of NCO with —NH$_2$ and —NH groups, and further increase the molecular weight of the polymer, as shown below:

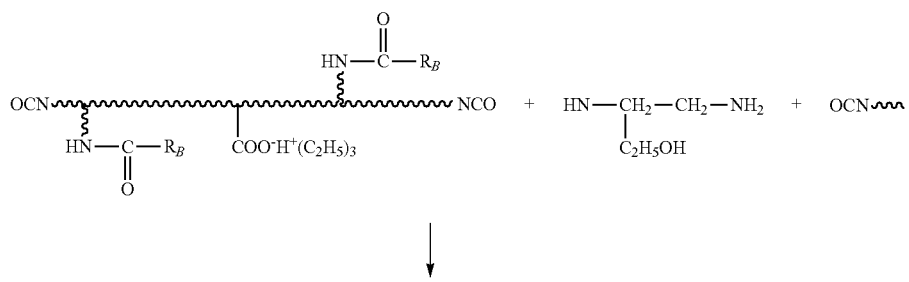

-continued

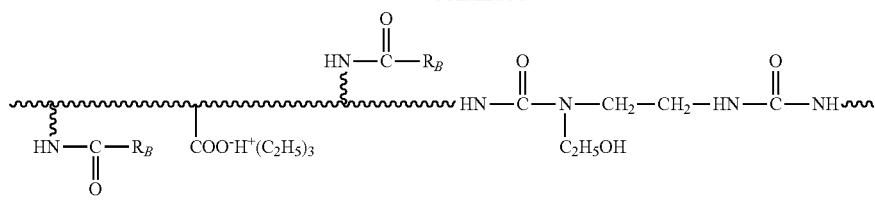

(e) in step (a), if the organic solvent added has a high boiling point such as N-methyl-pyrrolidone, the solvent does not require to be separated; if the solvent added is acetone or butanone, the solvent needs to be separated under reduced pressure by heating.

Based on the above technical solution, the polymer polyol is one of conventional polyester polyol, polytetrahydrofuran polyol (PTMG), ethylene oxide polyether polyol (PEG), propylene oxide polyether polyol (PPG), polycaprolactone polyol (PCL), polycarbonate polyol (PCD) and polyacrylate polyol (PA), or a mixture of several kinds thereof. The molecular weight thereof ranges from 400 to 3000, for example 1000 to 2000, and functionality thereof ranges from 2 to 3.

Based on the above technical solution, the isocyanate monomer is one of isophorone diisocyanate (IPDI), hexamethylene diisocyanate (HDI), dicyclohexylmethane diisocyanate (HMDI), tetramethylxylene diisocyanate (TMXDI), xylylene diisocyanate (XDI), methylene diphenyl diisocyanate (MDI), 2,4- and/or 2,6-toluene diisocyanate (TDI), or a mixture of several kinds thereof. In some embodiments, the isocyanate monomer is isophorone diisocyanate (IPDI) and/or dicyclohexylmethane diisocyanate (HMDI).

Based on the above technical solution, the NCO blocked agent is one of imidazole, 2-methylimidazole, 3,5-dimethylpyrazole, methylethyl ketone oxime, acetone oxime, acetanilide, diethyl malonate, phenol, ethyl acetoacetate and acetylacetone, or a mixture of several kinds thereof. In some embodiments, the NCO blocking agent is one or more of 3,5-dimethylpyrazole, methylethyl ketone oxime and diethyl malonate.

Based on the above technical solution, the hydroxyalkyl ethylenediamine chain extender is one of N-(2-hydroxyethyl)ethylenediamine, N,N-bis(2-hydroxyethyl)ethylenediamine, N-(2-hydroxypropyl)ethylenediamine and (1,2-ethanediyldiimino)bis-1-butanol, or a mixture of several kinds thereof. In some embodiments, the hydroxyalkyl ethylenediamine chain extender is N-(2-Hydroxyethyl)ethylenediamine and/or N,N-bis(2-hydroxyethyl)ethylenediamine.

Based on the above technical solution, the molar ratio of the blocked NCO to the hydroxyl groups introduced from the chain extender is 1:1-1.5:1.

Based on the above technical solution, the organic solvent is one of N-methyl-2-pyrrolidone, N-ethyl-2-pyrrolidone, dimethylacetamide, dimethylformamide, acetone and butanone, or a mixture of several kinds thereof. In some embodiments, the organic solvent is acetone and/or N-methyl-2-pyrrolidone.

Based on the above technical solution, the pH regulator is one of triethylamine, N-methylmorpholine and dimethylethanolamine. In some embodiments, the pH regulator is triethylamine.

Based on the above technical solution, the catalyst is one of organic tin, organic bismuth and organic silver. In some embodiments, the catalyst is environmentally friendly and efficient organic bismuth catalyst.

For the use of the above-mentioned aqueous polyurethane dispersion, the coating with excellent physical and chemical properties prepared by it can be cured for 20-30 min at 100-150° C. without adding additional crosslinkers or other resins. After the blocked NCO group is deblocked by heating, the NCO group reacts with the hydroxyl groups on the polymer macromolecular chain to form a sufficient cross-linked structure.

The deblocking process of NCO group is shown as follows:

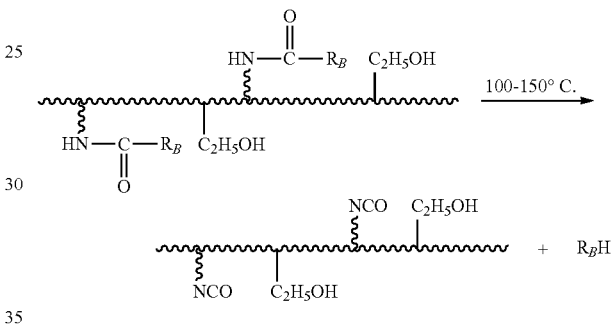

The cross-linking reaction between NCO groups and hydroxyl groups on the polymer macromolecular chain is shown as follows:

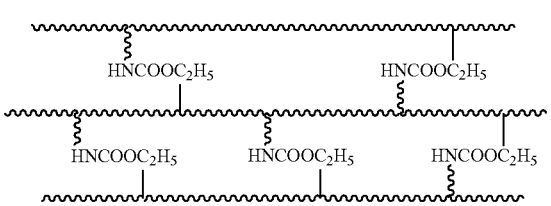

The present disclosure has the following beneficial effects: this disclosure designs an aqueous polyurethane dispersion containing both blocked NCO and hydroxyl groups. A one-pack waterborne coating with excellent physical and chemical properties can be prepared by the aqueous polyurethane dispersion without adding other waterborne resins and crosslinkers under high-temperature baking conditions.

DETAILED DESCRIPTION OF THE PREFERRED EMBODIMENT

Example 1

A preparation method was provided as follows: (a) 41.4 parts by weight of poly(adipate-1,6-hexanediol) diol (molecular weight: 2,000), 2.2 parts by weight of trimethylolpropane, 4.1 parts by weight of 2,2-dimethylol propionic acid, 36.9 parts by weight of isophorone diisocyanate, 22 parts by weight of acetone (not included in the total parts by weight of the final product), 0.02 parts by weight of organic bismuth were added in a reactor and reacted completely at 65-70° C. for 3 hour until the NCO content became slightly lower than the theoretical value; (b) 6.8 parts by weight of blocking agent 3,5-dimethylpyrazole was added to the above reactants, and reacted at 65-70° C. for 2 hour until the NCO content reached or became less than the theoretical value; (c) the above polymer was cooled to 20-40° C., then 3.1 parts by weight of pH regulator triethylamine was added, and the resulting mixture was dispersed into 184.6 parts by weight of deionized water with a stirring at a high speed; (d) 4.9 parts by weight of hydroxyethyl ethylenediamine chain extender was added and reacted at 10-40° C. for 30 min; (e) acetone was separated from the above product under heating and negative pressure to obtain an aqueous polyurethane dispersion containing blocked NCO and hydroxyl groups.

The above product had a solid content of 35.0%, blocked NCO content of 3.0% and hydroxyl content of 0.8% (calculated by dry solid). The molar ratio of the blocked NCO to the hydroxyl groups introduced from the chain extender is 1.5:1.

Example 2

A preparation method was provided as follows: (a) 38.1 parts by weight of polytetrahydrofuran diol (molecular weight: 1,000), 0.69 parts by weight of trimethylolpropane, 4.4 parts by weight of 2,2-dimethylol propionic acid, 36.9 parts by weight of isophorone diisocyanate, 15.0 parts by weight of N-methyl-2-pyrrolidone, 0.02 parts by weight of organic bismuth were added in a reactor and reacted completely at 70° C. for 3 hour until the NCO content became slightly lower than the theoretical value; (b) 7.3 parts by weight of blocking agent 3,5-dimethylpyrazole was added to the above reactants, and reacted at 70° C. for 2 hour until the NCO content reached or became less than the theoretical value; (c) the above polymer was cooled to 20-40° C., then 3.3 parts by weight of pH regulator triethylamine was added, and the resulting mixture was dispersed into 169.8 parts by weight of deionized water with a stirring at a high speed; (d) 6.1 parts by weight of hydroxyethyl ethylenediamine chain extender was added and reacted at 10-40° C. for 30 min to obtain an aqueous polyurethane dispersion containing blocked NCO and hydroxyl groups.

The above product had a solid content of 35.0%, blocked NCO content of 3.2% and hydroxyl content of 1.00% (calculated by dry solid). The molar ratio of the blocked NCO to the hydroxyl groups introduced from the chain extender is 1.3:1.

Example 3

A preparation method was provided as follows: (a) 37.0 parts by weight of polycarbonate diol (molecular weight: 1,000), 0.68 parts by weight of trimethylolpropane, 4.3 parts by weight of 2,2-dimethylol propionic acid, 38.0 parts by weight of isophorone diisocyanate, 20 parts by weight of acetone (not included in the total parts by weight of the final product), 0.02 parts by weight of organic bismuth were added in a reactor and reacted completely at 70° C. for 3 hour until the NCO content became slightly lower than the theoretical value; (b) 8.8 parts by weight of blocking agent 3,5-dimethylpyrazole was added to the above reactants, and reacted at 70° C. for 2 hour until the NCO content reached or became less than the theoretical value; (c) the above polymer was cooled to 20-40° C., then 3.2 parts by weight of pH regulator triethylamine was added and stirred evenly, and then the resulting mixture was dispersed into 183 parts by weight of deionized water with a stirring at a high speed; (d) 6.6 parts by weight of N,N-bis(2-hydroxyethyl)ethylenediamine chain extender was added and reacted at 10-40° C. for 30 min; (e) acetone was separated from the above product under heating and negative pressure to obtain an aqueous polyurethane dispersion containing blocked NCO and hydroxyl groups.

The above product had a solid content of 35.0%, blocked NCO content of 3.9% and hydroxyl content of 1.5% (calculated by dry solid). The molar ratio of the blocked NCO to the hydroxyl groups introduced from the chain extender is 1:1.

Application Example

The water resistance was measured according to GB/T1733-1993 by paint film water tolerance assay method.

Solvent resistance was measured according to GB/T23989-2009 standard by wiping with ethanol and butanone.

Acid and alkali resistance were measured according to GB/T9274-88 standard by soaking method at room temperature.

The aqueous polyurethane dispersions containing blocked NCO and hydroxyl groups were sampled to example 1, example 2 and example 3. The coating was heated at 120° C. for 30 min. After heating the coating film was cured and maintained at room temperature for 24 hour for testing.

The test results are as follows:

|  | Example 1 | Example 2 | Example 3 |
| --- | --- | --- | --- |
| Water resistance | Normal for 48 hours | Normal for 72 hours | Normal for 72 hours |
| Ethanol-tolerance | 20 times | 20 times | 100 times |
| Butanone-tolerance | 20 times | 20 times | 100 times |
| Acid resistance (5% $H_2SO_4$) | Normal for 12 hours | Normal for 48 hours | Normal for 48 hours |
| Alkali resistance (10% NaOH) | Normal for 12 hours | Normal for 48 hours | Normal for 48 hours |

What is claimed is:

1. A self-crosslinking aqueous polyurethane dispersion, including the following components:
   20-40% by weight of a hydroxyl-containing polyurethane with blocked NCO groups;
   60-80% by weight of deionized water;
   0-8% by weight of an organic solvent; and
   a pH regulator;
   wherein, the hydroxyl-containing polyurethane with blocked NCO has a blocked NCO content of 1.8-5.0% and a hydroxyl content of 0.5-2.0% based on the dry solid portion;
   wherein, the hydroxyl-containing polyurethane with blocked NCO is prepared by the following components:
   30-50 parts by weight of a polymer polyol;
   0.5-3 parts by weight of trimethylolpropane or trimethylolethane;
   30-50 parts by weight of a isocyanate monomer;
   3.0-6.0 parts by weight of 2,2-dimethylol propionic acid or 2,2-bis(hydroxymethyl)butyric acid;

5.0-15.0 parts by weight of a NCO blocking agent;
4.0-10.0 parts by weight of a hydroxyalkyl ethylenediamine chain extender;
0.01-0.05 parts by weight of a catalyst;
and wherein the self-crosslinking aqueous polyurethane dispersion is prepared by a method comprising:
(a) adding the polymer polyol, trimethylolpropane or trimethylolethane, isocyanate monomer, 2,2-dimethylol propionic acid or 2,2-bis(hydroxymethyl)butyric acid, catalyst and organic solvent to a reactor and reacting at 50-90° C. until the NCO content reaches or becomes less than a theoretical value to obtain a prepolymer, in which the isocyanate monomer is excessive;
(b) adding the NCO blocking agent to the prepolymer obtained in step (a) to partially block the NCO, and reacting at 50-90° C. until the NCO content reaches or becomes less than the theoretical value to obtain a polymer;
(c) cooling the polymers obtained in step (b) to 20-40° C., adding a pH regulator into the polymer, and then dispersing the polymer into the deionized water;
(d) then adding the hydroxyalkyl ethylenediamine chain extender, and reacting at 10-40° C. for 30 minutes; and
(e) in step (a), if the organic solvent added N-methyl-pyrrolidone, the solvent does not require to be separated; if the solvent added is acetone or butanone, the solvent needs to be separated by heating;
wherein a molar ratio of the blocked NCO to the hydroxyl groups introduced from the chain extender is 1:1 to 1.5:1.

2. The aqueous polyurethane dispersion according to claim 1, wherein the polymer polyol is one of polyester polyol, polytetrahydrofuran polyol (PTMG), ethylene oxide polyether polyol (PEG), propylene oxide polyether polyol (PPG), polycaprolactone polyol (PCL), polycarbonate polyol (PCD) and polyacrylate polyol (PA), or a mixture of several kinds thereof; the functionality thereof ranges from 2 to 3.

3. The aqueous polyurethane dispersion according to claim 1, wherein the isocyanate monomer is one of isophorone diisocyanate (IPDI), hexamethylene diisocyanate (HDI), dicyclohexylmethane diisocyanate (HMDI), tetramethylxylene diisocyanate (TMXDI), xylylene diisocyanate (XDI), methylene diphenyl diisocyanate (MDI), 2,4- and/or 2,6-toluene diisocyanate (TDI), or a mixture of several kinds thereof.

4. The aqueous polyurethane dispersion according to claim 1, wherein the NCO blocking agent is one of imidazole, 2-methylimidazole, 3,5-dimethylpyrazole, methylethyl ketone oxime, acetone oxime, acetanilide, diethyl malonate, phenol, ethyl acetoacetate and acetylacetone, or a mixture of several kinds thereof.

5. The aqueous polyurethane dispersion according to claim 1, wherein the hydroxyalkyl ethylenediamine chain extender is one of N-(2-hydroxyethyl)ethylenediamine, N,N-bis(2-hydroxyethyl)ethylenediamine, N-(2-hydroxypropyl)ethylenediamine and (1,2-ethanediyldiimino)bis-1-butanol, or a mixture of several kinds thereof.

6. The aqueous polyurethane dispersion according to claim 1, wherein the organic solvent is one of N-methyl-2-pyrrolidone, N-ethyl-2-pyrrolidone, dimethylacetamide, dimethylformamide, acetone and butanone, or a mixture of several kinds thereof.

7. A method for preparing one-pack waterborne coatings by using the aqueous polyurethane dispersion according to claim 1, performing a cross-linking reaction between the NCO and hydroxyl groups on the polymer macromolecular chain to form a cross-linked structure by curing at 100-150° C. for 20-30 min.

* * * * *